July 25, 1961 R. STEENECK 2,993,956
ERROR DETECTING SYSTEM FOR TELEGRAPH TRANSMISSION
Filed Aug. 9, 1957 10 Sheets-Sheet 4

INVENTOR.
R. STEENECK
BY
ATTORNEY

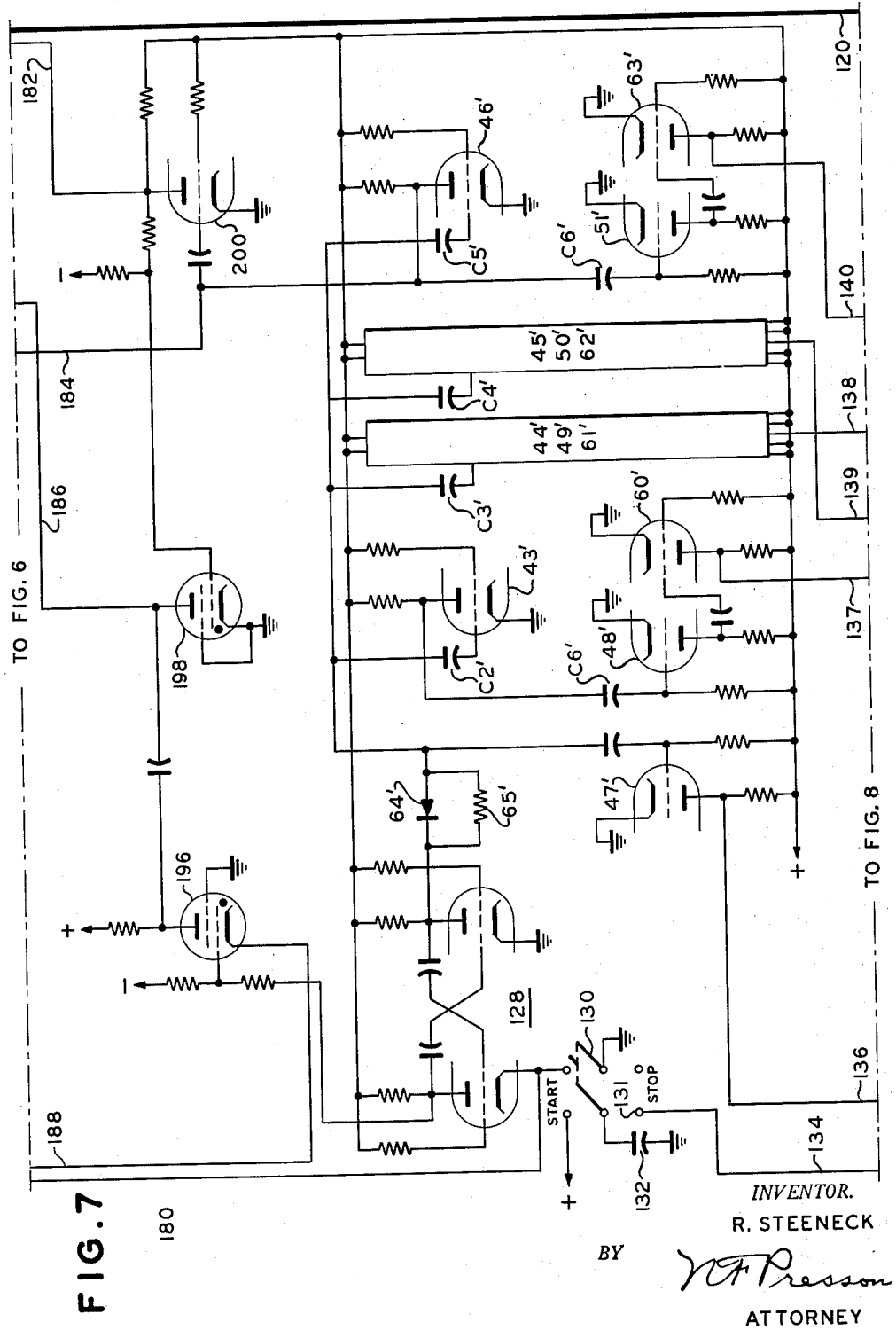

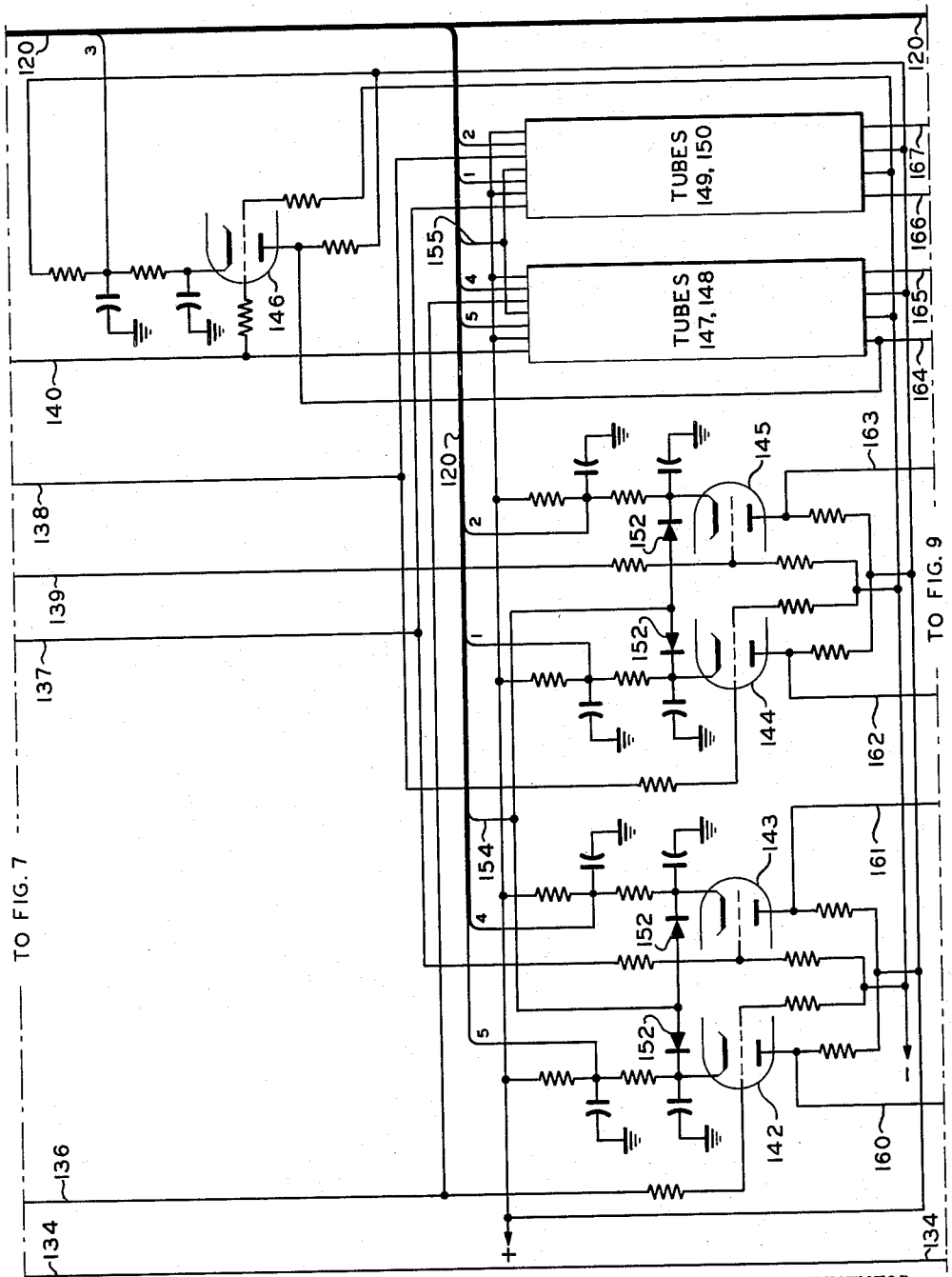

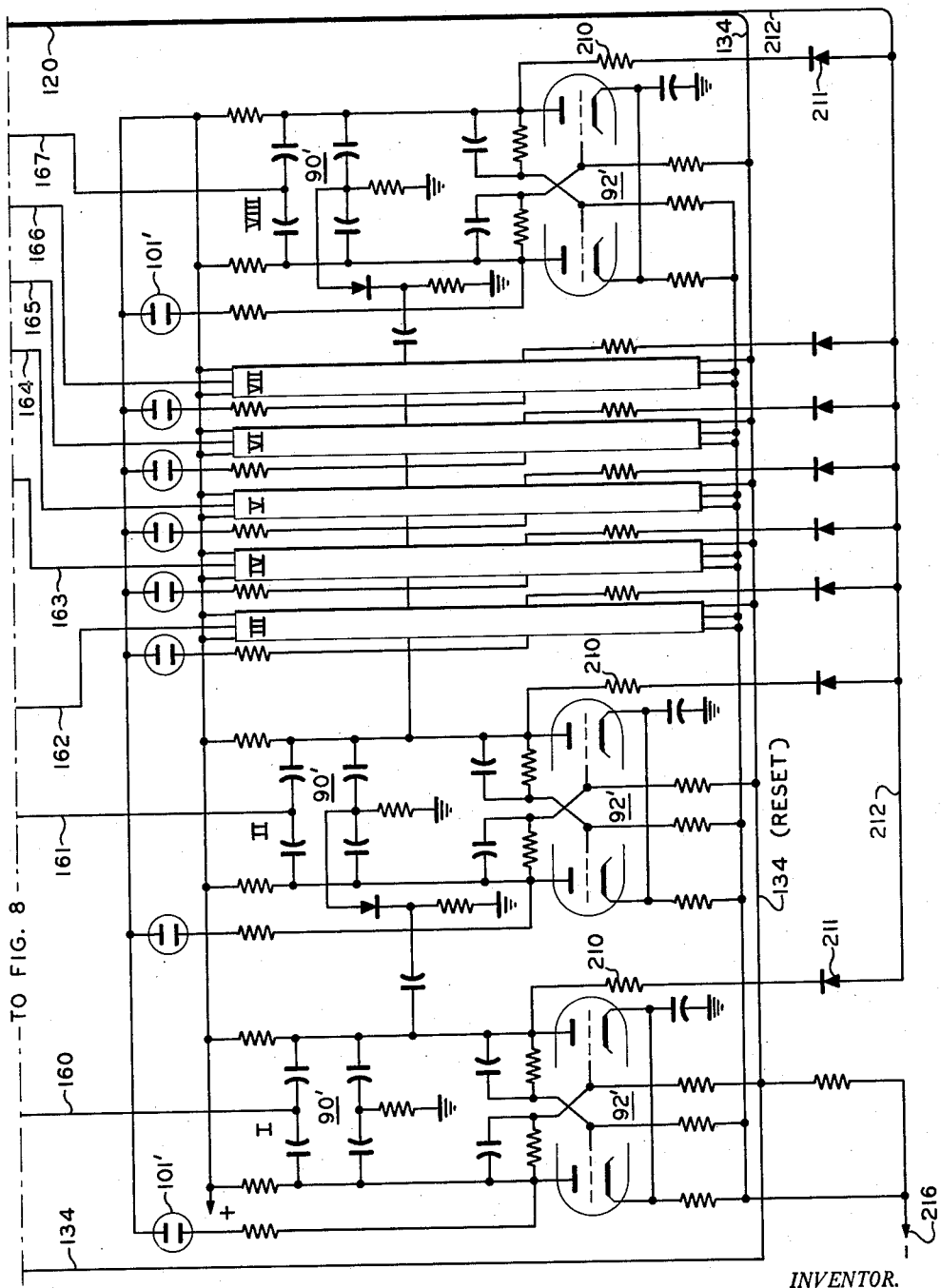

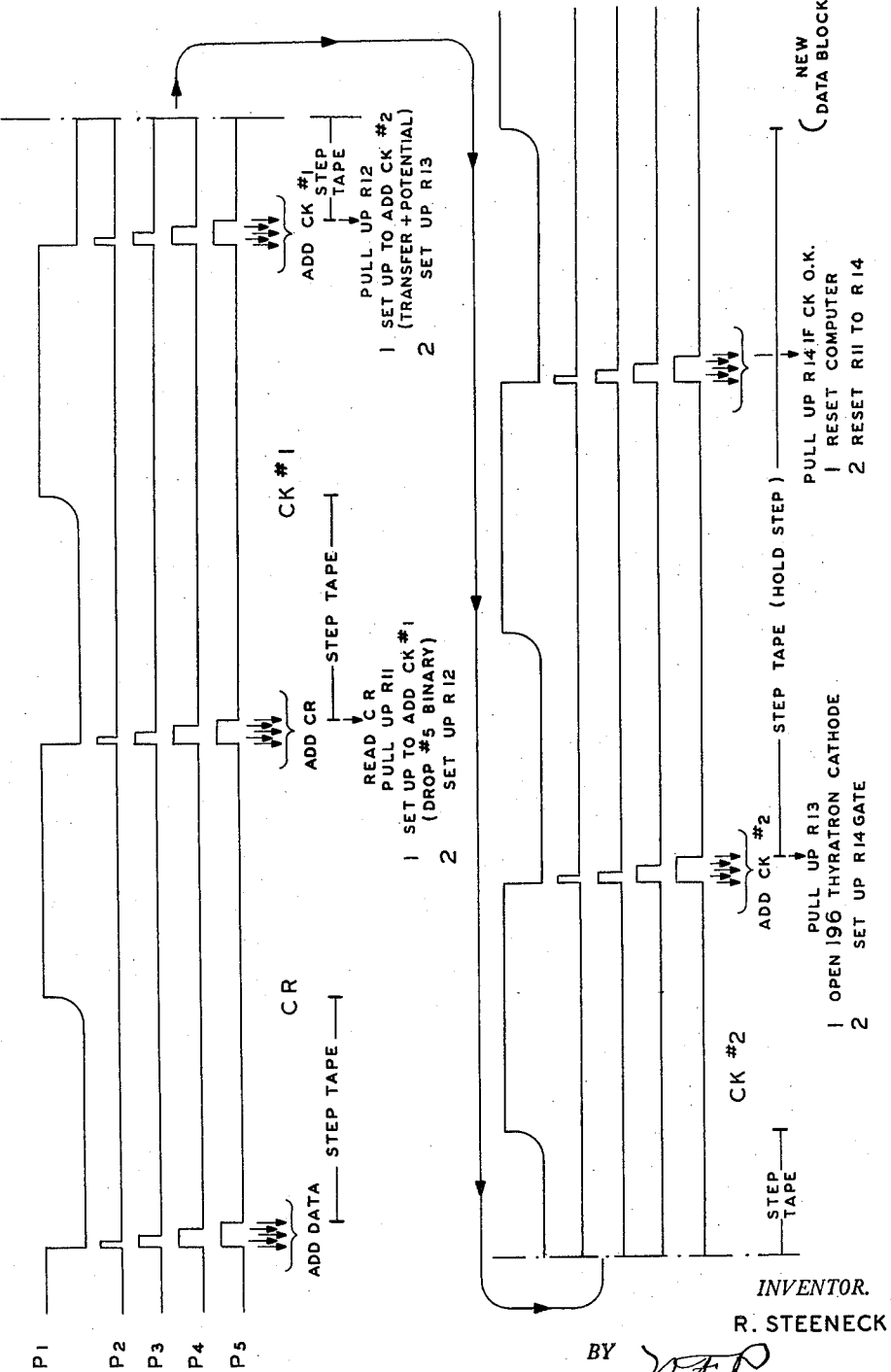

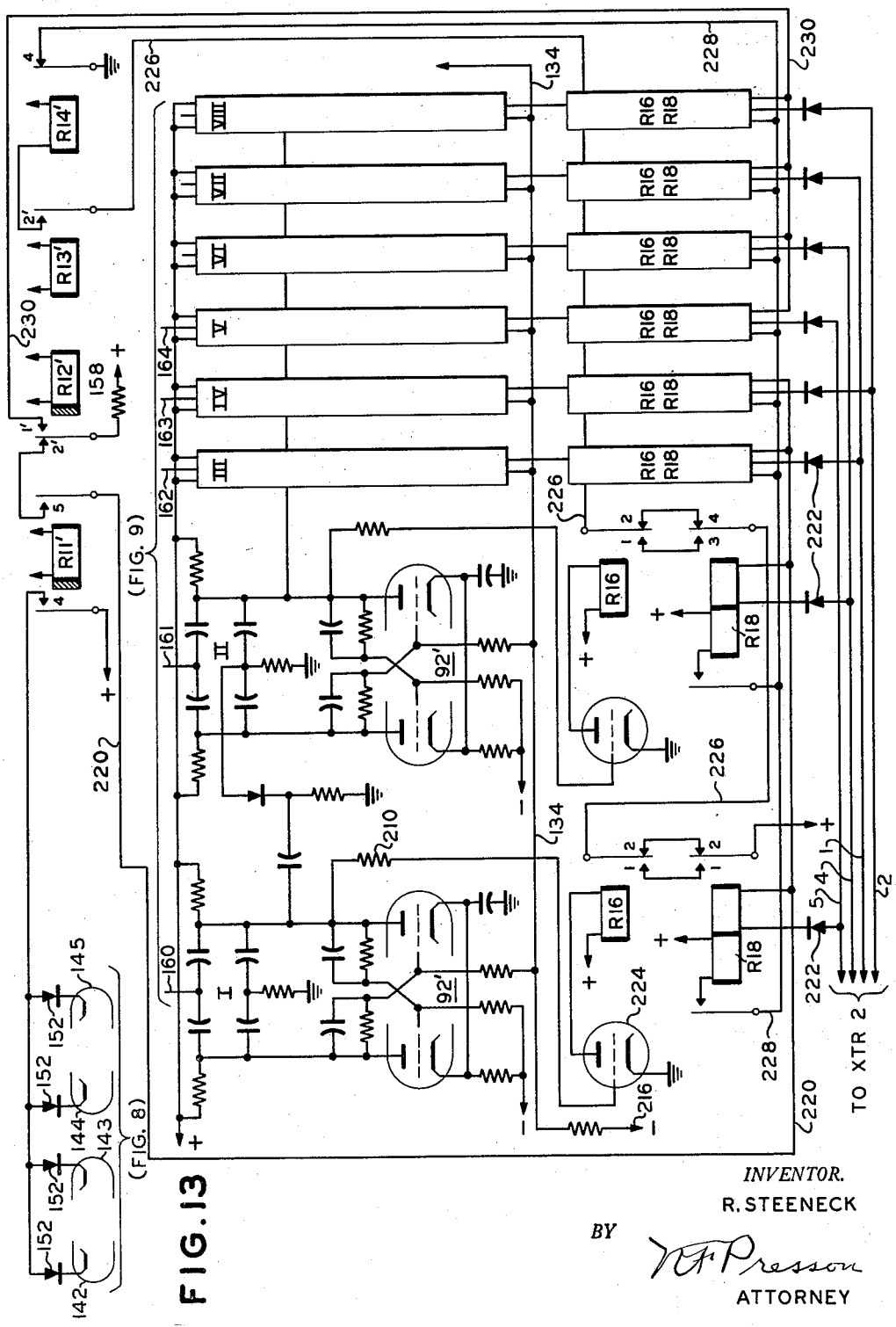

2,993,956
ERROR DETECTING SYSTEM FOR TELEGRAPH TRANSMISSION
Robert Steeneck, New York, N.Y., assignor to The Western Union Telegraph Company, New York, N.Y., a corporation of New York
Filed Aug. 9, 1957, Ser. No. 677,264
15 Claims. (Cl. 178—23)

This invention relates to an error detecting system for telegraph transmission, and more particularly to an improved method and system for detecting errors in the pulse code combinations representing the characters of a received telegraph message prior to retransmitting the message characters either to an outgoing line or to data processing equipment.

Telegraph transmission systems are subject to extraneous interferences but even if these are not present it is necessary to detect against the introduction of errors due to equipment and component failures. Many schemes have heretofore been devised to provide error detection in the code combinations representing the characters of a received message. Almost invariably such schemes require considerable redundancy, that is, the transmission of considerably more information than is necessary to comprise the text of a message.

Examples of checking codes in which the redundancy is individual to each character are the odd or even parity codes, and the codes having a fixed ratio of marking and spacing pulses. The parity codes may be 5, 6, 7 or 8-level codes, but in any case each valid code combination has an odd number of marking pulses when an odd parity check is employed, or an even number of marking pulses for an even parity check. Examples of the fixed ratio codes are the familiar 8-level code where all valid code combinations have four marking pulses, the 7-level code where all valid code combinations have three marking pulses, and the 5-level code where all valid code combinations have two marking pulses. The term "level" is now commonly used in the art to refer to the relative position or sequential order of each of the intelligence pulses comprising each character.

While the fixed ratio codes are more redundant than the parity codes, they are less subject to compensating errors. For example, the loss or gain of two pulses is undetected by parity codes but is caught by the fixed ratio code, but both types of codes fail to detect a loss or repetition of the complete characters, and fail to detect the loss and gain of a pulse within the same character.

Public telegraph systems and most private wire networks, both commercial and military, usually operate with the 5-level telegraph code. Since this is the common telegraph language there are a large number of business machines and other data equipments in daily use that function with 5-level perforated tapes. The instant invention provides a more suitable method and system for error detection and correction in 5-level code transmission, and is equally applicable to checking alphabetic and numeric information. The instant system employs a totalizing technique in which either the marking or spacing pulses in a line of data are totaled on a weighted computational basis. Each code combination comprising a character is accorded a corresponding number since each level of the 5-level code is assigned a different computational weight or value. The five levels respectively represent the five code positions of the marking and spacing code units which comprise each character. While either analogue or digital values may be employed, it is convenient for computing purposes to employ a system of binary numbers. In a binary system, for example, the first level may be assigned the value of 1, the second level the value of 2, the third level 4, the fourth level 8, and the fifth level 16. It will be noted that not only do the different signal code levels have different values for checking purposes but also that the sum of the values representing any two adjacent signal code levels of a message character never is equal to the value represented by any one of the remaining code levels of the character, and thus the probability of compensating errors affecting the accuracy of the checking operation is extremely low and actually is nil in regard to such errors occurring within any one character.

The characters comprising a message may be transmitted either directly by a keyboard transmitter or may be perforated in a tape or other control form by a perforator for subsequent transmission by a tape transmitter. At certain intervals during the transmitting or the perforating operation, preferably when the characters comprising each line of data have been transmitted or perforated, as the case may be, a control character is inserted to initiate a checking operation. Such a control character conveniently may comprise a "carriage return" signal which, when the message is received and transcribed by a receiving printing or punching apparatus, indicates the end of a line of data. The perforated tape is then stepped through a tape transmitter to generate the code pulses of each character, which pulses are transmitted in succession to an outgoing telegraph line or other circuit by means of a distributor which in the case of a start-stop system automatically inserts start and stop pulses for each character. The total value of all the code combinations comprising the characters in each line of data is obtained by feeding the different valued pulses of one nature (i.e., either marking or spacing) of each code combination as it is read by the tape transmitter, into the corresponding stages of a computer or counter.

In the illustrative embodiment of the checking system disclosed herein in which binary numbers are employed it is feasible to restrict the binary counter to eight stages, and thus the counting is on a modulus of 256 since each time the counter passes through a count of 256, it starts over at 1. The binary total representing the resultant of the aggregate values of the weighted pulses of one nature, for example, the marking pulses, of the character of each line of data equals a number of which is registered in the "1" side of the stages of the computer. In one form illustrated the read-out is made from the "0" side of the stages of the computer at the transmitting station, which read-out is the complement of the binary total of the line. An end-of-line signal such as the foregoing "carriage return" is transmitted, and then the first four bits of this complement are transmitted as the first, second, fourth and fifth pulses of a first checking character. The last four bits of this complement are next transmitted as the first, second, fourth and fifth pulses of a second checking character. It is highly important that the checking character will not interfere in any manner with certain functions performed in a telegraph system, for example, switching operations either at telegraph switching centers or at terminals and also that the checking characters will not interfere with various functions in a telegraph printer or other receiving apparatus. Therefore, the checking characters are modified prior to their transmission in a manner to prevent them from fortuitously corresponding to any of certain function signals, such as "blanks" which are deleted by some switching systems; two consecutive "carriage returns" or "figure shift" followed by H, each of which comprises an end-of-message signal commonly employed in telegraph switching systems and printer operations; and "line feed" signals. In each of the foregoing function signals the third code pulse is spacing and to prevent the checking characters from being misinterpreted as any of these function signals a marking pulse is invariably inserted in the third pulse position of each checking character. Two other function signals, namely, "letter shift" and "space" have the third pulse marking, but do not interfere in any way with the functions of the present switching systems. As hereinafter explained, the added third marking pulse of each foregoing character is automatically disregarded at the station where a checking operation is to be performed prior to applying the checking characters to the error detecting means.

At the receiving end of the telegraph circuit the code signals of the incoming message are received by a tape reperforator, and the binary numbers representing the received checking characters are read into an eight stage binary adder. Upon detecting each end-of-line signal (carriage return) the receiving equipment directs the immediately following eight bits containing the checking information into their respective stages of the adder. Since these eight bits are the complement of the binary total at the sending end, every stage of the adder at the receiving end will be set to its "1" condition if there were no errors. If there is any deviation from all stages being set to "1," that is, if any stage should register "0," this indicates an error and an alarm is sounded, whereupon the sending station may be requested to resend the line of the text in which the error is detected. It will be appreciated that the reverse operation may also be employed, in which case the complement of the binary total at the receiving station may be read out and the check characters sent to the transmitting station and applied to the stages of the binary adder at the sending end, whereupon if any stage there should register "0" an error would be indicated.

In a modified form illustrated, the binary total may be read out at one station and transmitted to the other station and compared with the binary total obtained at said other station; if agreement is not found an error is indicated. If desired, however, the complements of the binary totals may be compared; a mismatch between them will indicate an error.

It is an object of the instant invention to provide a method and system for detecting errors in the pulse code characters of a received telegraph message, which is more nearly infallible than error check methods heretofore employed.

Another object is to provide an error check system of the character described in which redundancy due to the insertion of error check characters is substantially reduced.

A further object is the provision of an error check system in which the accuracy thereof is not affected by errors of the type which in prior check systems would be compensating and thus undetected.

Still another object is to provide an error detecting system which gives protection against either the loss or repitition of a complete character during transmission.

An additional object is the provision of an error check system having the features above described and which is well adapted for use with conventional 5-level code telegraph transmission.

A still further object is to produce and transmit error checking signals of a nature such that they will not fortuitously correspond to certain function signals commonly employed in telegraph systems to perform switching and other operations, thereby to prevent the checking signals from interfering with such operations.

Other objects and advantages will be apparent from the following detailed description of an illustrative embodiment of the improved system, taken in connection with the accompanying drawings in which:

FIGS. 1, 2 and 3 collectively comprise a schematic circuit diagram of one embodiment of the error detecting system at the transmitting end of a start-stop telegraph circuit;

Figure 1:
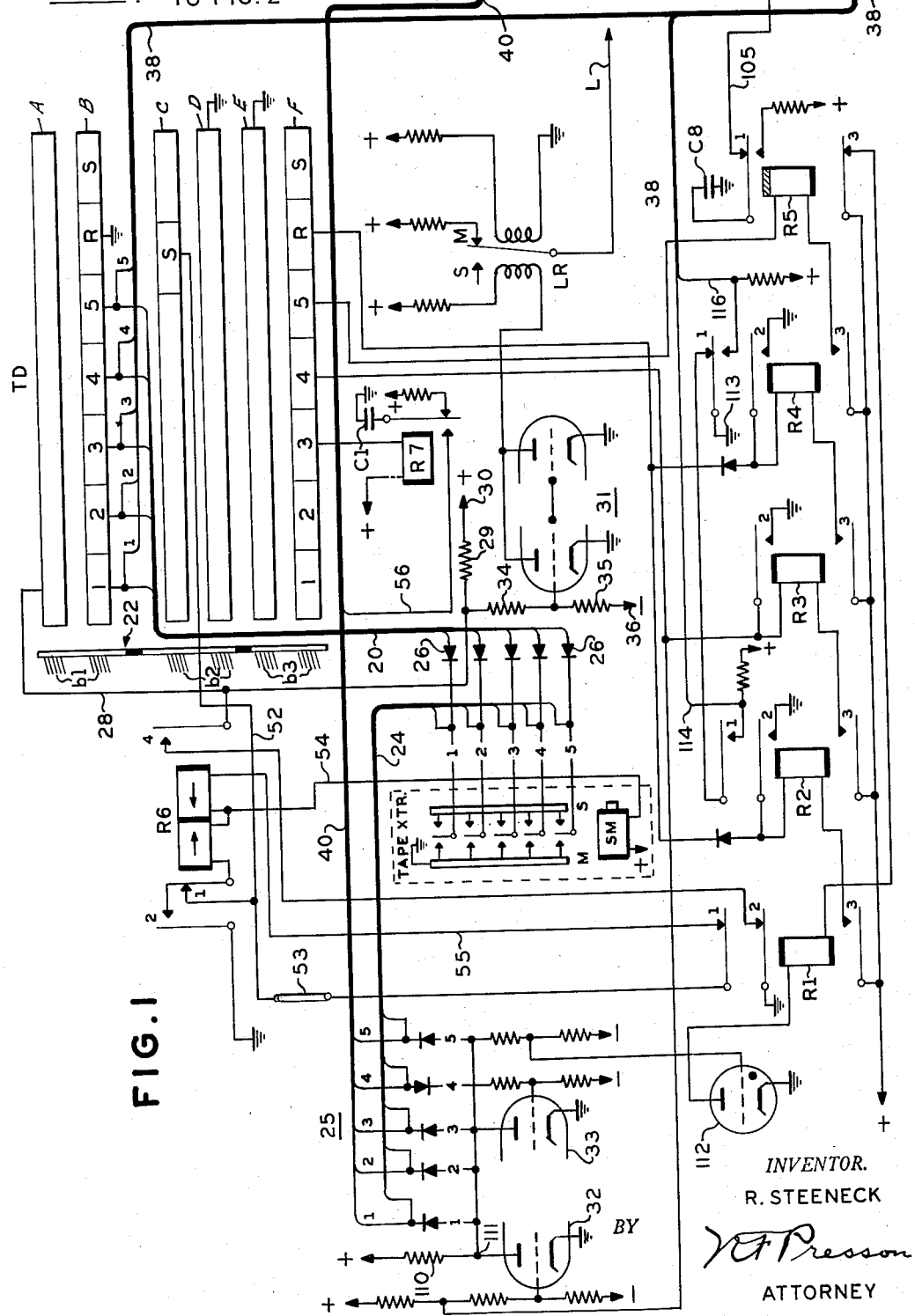
Figure 2:
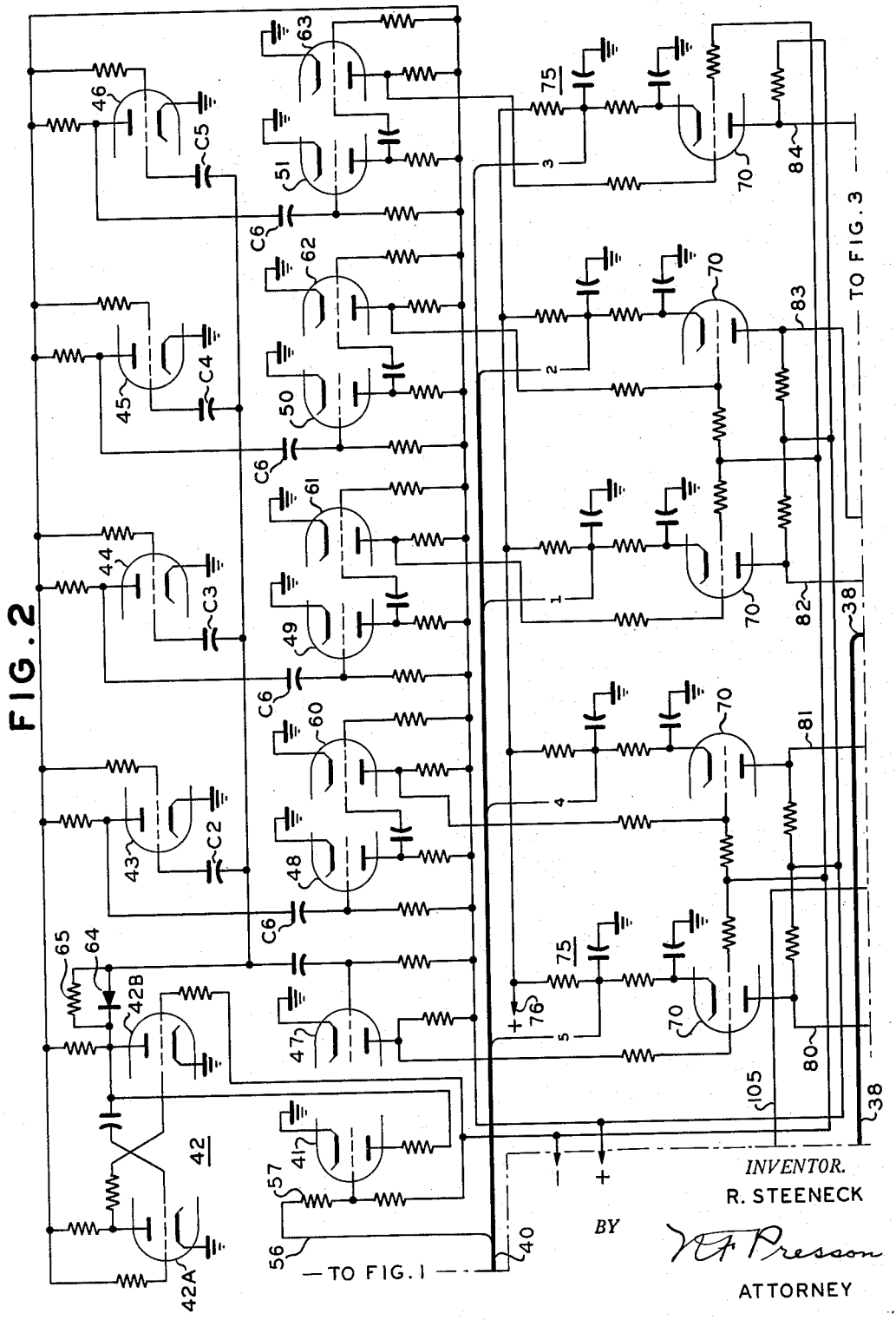
Figure 3:
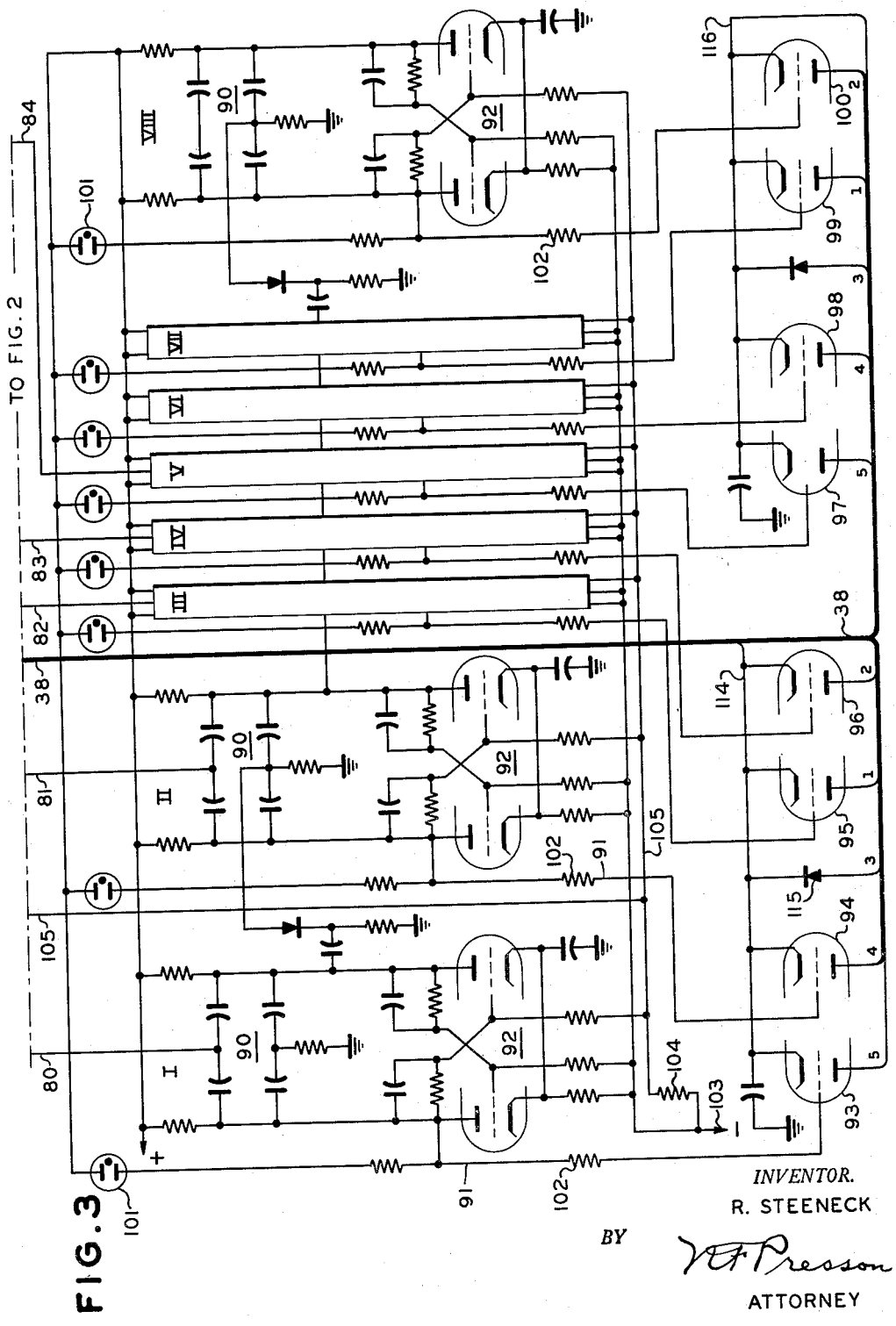
Figure 11:
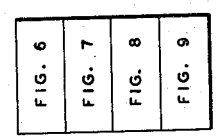
Figure 12:
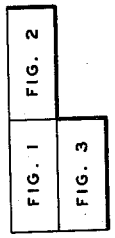

FIGS. 6, 7, 8 and 9 collectively comprise a schematic circuit diagram of the equipment and connections of the error detecting system at the receiving end of the telegraph circuit;

FIG. 10 is a timing chart showing the application of incoming signal pulses to the error detecting system at the receiving end of the telegraph circuit;

FIG. 11 shows the manner in which FIGS. 1, 2 and 3 should be arranged with respect to one another;

FIG. 12 similarly shows how FIGS. 6, 7, 8 and 9 should be arranged; and

FIG. 13 is a schematic circuit diagram of a modification of the error detecting system as employed in a start-stop telegraph circuit.

Transmitting circuit

In the illustrative form of the invention shown in the drawings, transmission of the messages is effected by a 5-level permutation code start-stop system. Preferably, although not necessarily, the characters of each message are perforated in a tape by a conventional tape perforator, and the perforated tape is then fed through a tape transmitter TAPE XTR, FIG. 1 of the drawings, which transmitter includes a marking bus M, a spacing bus S, five contact tongues whose signal positions are controlled by five feeler pins which sense each permutation code signal in the perforated tape as it is stepped through the transmitter under control of a step magnet SM, all in known manner. Associated with the tape transmitter are a transmitting distributor TD and a line relay LR for transmitting the code pulses of each character in succession over an outgoing line L and thence to a receiving station. The numerals 1 to 5 appearing in the conductors leading from the contact tongues of the tape transmitter correspond to the five code levels of the permuted marking and spacing pulses which comprise each character. These conductors have diode rectifiers 26 therein to prevent interaction between various of the circuits, and extend by means of a cable 20 to the corresponding segments 1 to 5 of a segmented ring B of the distributor TD, this ring also having a rest segment R and start segment S thereby to produce start-stop signals.

The conductors 1 to 5 from the tongues of the tape transmitter also extend through a cable 24 to a gating circuit 25 which is operative to detect a character that initiates an error check operation and which was perforated in the tape at the end of each line or block of characters, or wherever an error checking operation is desired; the operation of the gating circuit is described in detail hereinafter.

The transmitting distributor TD is of the free running type, and has pairs of rings A and B, C and D, and E and F; the rings of the pairs are traversed by pairs of brushes $b1$, $b2$ and $b3$ carried by the rotating distributor arm 22. The transmitting rings A and B cause the marking and spcing pulses read by the tape transmitter to control the line relay LR for transmitting the signals over the line L. The local rings C, D, E and F are for timing and control purposes. At the segments 1 to 5 of ring B, the conductors 1 to 5 also extend through a cable 38 to a computer-readout circuit shown in the lower portion of FIG. 3. At the gating circuit 25 the conductors 1 to 5 from the tongues of the tape transmitter extend through a cable 40 to a coupling circuit, seen in FIG. 2, which operates as an input circuit for the computer shown in FIG. 3.

Referring again to FIG. 1, the solid ring A of the transmitting distributor TD is connected by a conductor 28 and a resistance 29 to a source 30 of positive battery.

The source 30 is also connected through the resistance 29 and a resistance 34 in series, to the grids of a twin-section vacuum tube 31 which may be of any suitable type, for example, 12AU7. The grids of this tube are also connected by a resistance 35 to a source 36 of negative battery. The values of the resistors 29, 34 and 35 are such that the tube 31 is in a conducting state except when a marking (ground) pulse is applied by the tape transmitter to any of the segments 1 to 5 of the ring B of the distributor. The line relay LR has the righthand winding thereof in circuit with positive battery and ground, and the lefthand winding thereof is connected in a circuit extending from positive battery to the plates of tube 31. Thus, when a marking pulse appears on any of the segments 1 to 5 of ring B during the traverse of the brushes b1, the tongue of the line relay LR is attracted to its righthand position and causes a marking pulse of positive polarity to be transmitted to the line L; when any of the segments 1 to 5 is spacing in character, the tube 31 is conducting and the ampere turns of the lefthand winding of LR are such that the current flowing through the winding is sufficient to actuate the tongue to the space contact S and send a spacing (no current) pulse to the line.

Ring C of the distributor has a stepping segment S and when this segment is traversed as the brushes b2 pass over the rings C and D, ground potential is applied to a circuit comprising a conductor 52, contacts 1 of an autostop relay R6 and the lefthand coil of the relay, and conductor 54 to the stepping magnet SM to positive battery. However, this ground is also applied through a manually controlled autostop switch 53 and contacts 1 of a relay R1 and conductor 55 to the righthand winding of the relay R6. The windings of the relay are in opposition so that with current flowing in both coils the relay does not operate, although the step magnet operates to pull down the transmitter feeler pins and permit the next character in the tape to be stepped in position for sensing by the feeler pins during transmission of the message characters. As hereinafter explained, however, if the relay R1 is energized due to presence over the transmitter pins of a character which initiates a checking operation and which is detected by the gating circuit 25, the lefthand winding only of R6 is energized and the relay operates and locks up through its make-before-break contacts 2 and applies ground to the stepping magnet circuit to hold the transmitter pins in retracted position and prevent stepping of the tape while error checking characters are being transmitted by the distributor TD.

Figure 4:
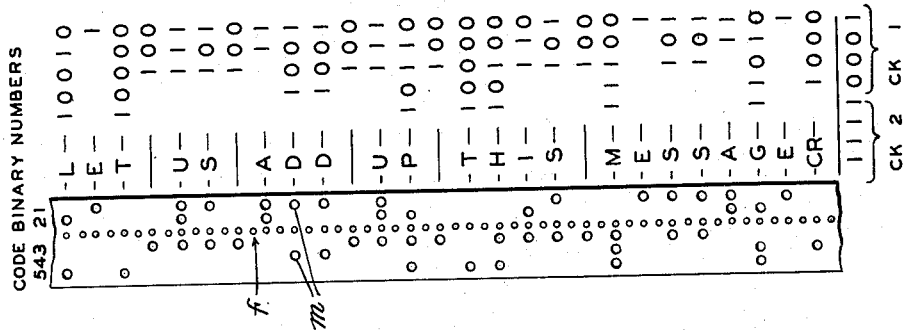
FIG. 4 illustrates the scheme of binary numbers as assigned to various pulse code message characters for error checking purposes.
Figure 5:
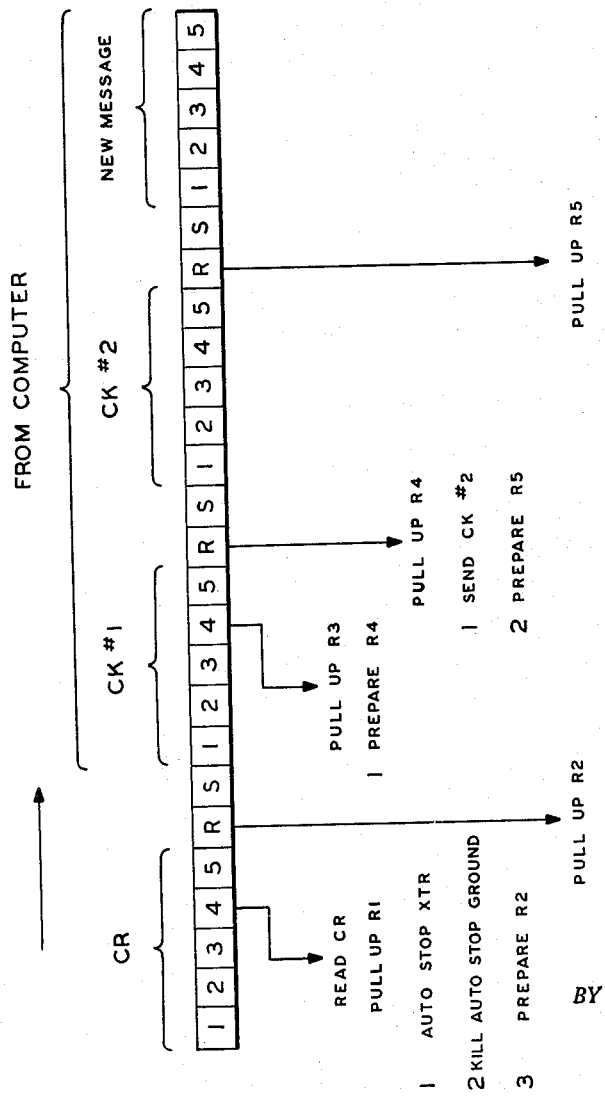
FIG. 5 is a timing chart in regard to the transmission of error checking characters at the end of each line of the message being sent.

*Computer operations.*—In the embodiment of the invention illustrated herein the marking pulses of each message character have different computational values respectively corresponding to the different signal code levels which they occupy, and for convenience the computation is effected by means of binary numbers. Referring to FIG. 4 of the drawings there is shown a length of perforated tape such as would be passed through the tape transmitter. The row of holes *f* are the feed holes for stepping the tape through the transmitter, and the holes *m* permit the proper feeler pins of the tape transmitter to rise and produce marking pulses. The unperforated portions of the tape in the various signal code levels represent spacing pulses. The five signal code levels are indicated by the digits 1, 2, 3, 4 and 5 appearing at the top of the length of tape. Immediately at the right of the tape shown appears characters which are represented by the various code combinations in the tape, and at the right of these characters appear their corresponding binary numbers employed for computational purposes. It will be understood that digit selections in the tape as well as letter selections may also be represented by their corresponding binary numbers. Each marking pulse is represented by a binary "1" in the proper denominational order or stage in the computer corresponding to the signal code level occupied by the marking pulse; a spacing pulse is represented by "0" in the proper denominational order. At the lower end of the tape the letters CR appear opposite the corresponding perforated character in the tape, and this is a preparatory signal which initiates an error checking operation after a desired number of message characters, for example, a line of the text, have been sensed by the transmitter. A carriage return signal, indicated by the letters CR, may conveniently be employed for this purpose since in the message received at a receiving station and printed on a receiving blank or punched in a control card, a desired carriage return operation is effected. Each of the binary numbers is entered in a binary computer which maintains a running total until the carriage return signal has been sensed and also entered in the computer, whereupon the aggregate or total of the binary numbers are employed as error check signals. In FIG. 4 the total has been carried out to eight places and this has been found to be sufficient for checking purposes. This total consisting of eight binary digits is then transmitted as two checking characters each composed of a group of four code pulses.

Referring again to FIG. 1, segment 3 of the ring F of the transmitting distributor TD is the "computing" segment. When ground potential from ring E is applied to this segment by the distributor brushes b3, a relay R7 is pulled up and its armature transfers a charged capacitor C1 (which charges up to about 150 volts positive) to an "add" conductor 56. This conductor enters the cable 40 and extends to a pulse-forming tube circuit shown on FIG. 2 which forms the pulses that are applied to the computer, or binary counter, shown on FIG. 3. The positive charge from the capacitor C1 over conductor 56 dissipates through a resistor 57, FIG. 2, and is applied to the grid of a tube or tube section 41 to make the tube momentarily conductive and this starts off a 1-shot multivibrator 42. The plate of the righthand section 42B of the multivibrator immediately drops in potential and remains in this condition for the time of the 1-shot cycle which has a time interval slightly longer than that of segment 3 of the distributor ring F.

Lowering the potential of the plate of the section 42B also lowers the potential on the grids of a row of four normally conducting pulse-delay tubes 43, 44, 45 and 46. The tubes 43 to 46, however, recover conductivity relatively soon after they have been cut off by the momentarily lowered potential on the plate of the section 42B of tube 42. The cut-off of the tubes 42 to 46 raised the potential on their corresponding plates which respectively are coupled by capacitors C6 to the grids of four normally conducting pulse-forming tubes or tube sections 48, 49, 50 and 51. This potential rise has no effect on the pulse-forming tubes, however. When tubes 43 to 46 again become conductive and their corresponding plates are lowered in potential they now momentarily cut off tubes or tube sections 48 to 51. The tubes 43 to 46 recover their conductivity at different time intervals as determined by the values of the capacitors C2 to C5 which couple them to the righthand section 42B of the multibrator 42. For example, C2 may have a value of 330 mfd., C3 680 mfd., C4 1500 mfd., and C5 2200 mfd. Time-spaced pulses are thus formed on the plates of the tubes 48 to 51, and these pulses are further amplified and sharpened by coupling them to tubes 60, 61, 62 and 63. The first timing pulse is formed directly by the righthand section 42B of the multivibrator by coupling it directly to a tube 47 and is sufficiently sharp to require no further amplification. A diode 64, bridged by a resistor 65, obviates the possibility of a small spurious pulse being generated and amplified when the 1-shot multivibrator completes its cycle; such a spurious pulse if present would adversely affect the proper operation of the computer hereinafter described.

The pulses formed by tubes 47, 60, 61, 62 and 63 momentarily make five coupling tubes or tube sections 70 conducting in succession. These tubes have their cathodes connected through resistor-capacitor networks 75 to a source 76 of positive battery and are not conducting even though the pulses from tubes 47, 60, 61, 62 and 63 tend to make them conduct. In order to make any of the tubes 70 conducting it is necessary to ground their cathodes, and this is done by connecting the appropriate points of their cathode RC networks 75 to the reading contacts of the tape transmitter, by means of conductors 1 to 5 in cable 40. The reading contacts which are marking are grounded and cause the corresponding tubes 70 to conduct, and those that are spacing will leave a high positive potential on the cathodes on the corresponding tubes and cause them to remain nonconducting. The particular order of assignment of the foregoing conductors to the coupling tubes 70 will be explained later.

The plates of tubes 70 respectively are connected, by means of conductors 80 to 84, through capacitor networks 90, FIG. 3, to the first five stages I to V of the computer, or binary adder, shown in the figure. The counter comprises eight binary stages I to VIII, and each of the stages comprises a twin-section computer tube 92, the sections of which are connected in a flip-flop circuit of the Eccles-Jordan type. The conduction of any of the coupling tubes 70 of FIG. 2 causes the corresponding bistable computer tubes 92 of the first five stages to select their opposite states of conduction. The computer tubes of the eight stages I to VIII of the binary counter are also connected so as to control each other serially to produce a binary count as the message characters are sensed by the tape transmitter. For this reason it is necessary for the input pulses to stages I to V to be received in succession to prevent interference with the serial coupling between the stages of the binary counter. Stages VI, VII and VIII are operated serially from the operation of stage V to produce an eight digit binary number.

The computer stages are designed to operate from a potential of +150 volts to −150 volts in a network such that the plates of those sections of the tubes 92 which are conducting are negative in potential, and when not conducting are postive in potential. It is thus possible to control eight readout tubes 93 to 100 by connecting their grids through high limiting resistors 102 in conductors 91 directly to the plates of tubes 92. Neon lamps 101 give a visual indication of the status of the individual computer stages, and are caused to glow when a "1" is registered in the corresponding binary stage. The grids of the righthand sections of tubes 92 return to negative battery 103 through a common resistor 104 of approximately 1000 ohms in a reset circuit which comprises a conductor 105 that extends to FIG. 1, and this common return is employed to reset the computer tubes all to zero condition by applying a positively charged capacitor C8, seen in the lower righthand corner of FIG. 1, to reset lead 105 upon the release of relay R5. In the zero condition of the computer the righthand section of each computer tube 92 is conducting. The lefthand section of each computer tube 92 is connected to the grid of one of the readout tubes 93 to 100 and reads marking when a zero is stored in the corresponding computer section, thus sending the complement of the binary number at the time registered in the computer.

In the particular order of assignment of the conductors 1 to 5 of cable 40 to the coupling tubes 70, FIG. 2, it will be noted that signal code level 5 has been assigned to binary stage I of the computer of FIG. 3. The reasons for this are that more counts in the first binary stage are required to fill the eight digits in the computer, and pulse No. 5 is most apt to fail because in a perforated tape its physical position is farthest away from the feed holes, as will be seen from FIG. 4, and hence is more sensitive to any slight skewing of the tape as it passes through the transmitter. Also, when distributed it is farthest away from the synchronizing start pulse. The other pulses also are assigned with particular reference to their positions with respect to the feed holes: signal level 4 is assigned to binary stage II, and signal levels 1, 2 and 3 respectively are assigned to binary stages III, IV and V.

*Carriage return gate circuit.*—The tube section 33, FIG. 1, of the read gate circuit 25 is conducting except when the No. 4 code pulse from the tape transmitter TR is marking. A resistor 110 in the plate circuit of tube section 33 is grounded out when either the first, second, third or fifth code pulse of a character is marking. The potential at a junction point 111 below the resistor 110 can only rise if both sections 32 and 33 are not conducting and if code pulses 1, 2, 3 and 5 are all spacing. Tube section 33 is cut off when code pulse 4 is marking. Tube section 32 is cut off when brushes $b3$ pass over segment 4 of ring F, thereby connecting segment 4 to ground. When all these conditions are present this indicates that a carriage return signal is sensed by the transmitter. At this time the potential at point 111 rises and a thyratron 112 becomes conducting and pulls up relay R1 of the counting chain R1 to R5. Contacts 1 of relay R1 open the auto-stop circuit and prevent further stepping of the transmitter at this time. Contacts 2 of R1 remove the ground from the auto-stop relay circuit normally used to hold outgoing transmission inoperative during the auto-stop period, and this permits the transmission of the error check characters. Contacts 3 partially prepare a path for the operation of relay R2. R2 operates when the brushes $b3$ pass over segment R of the ring F, completing a circuit to ground through ring E.

At its upper contacts 1 energized relay R2 applies ground potential 113 obtained through contacts 1 of relay R4 to the first check conductor 114 that extends in cable 38 to the cathodes of the four readout tubes 93 to 96 of FIG. 3, and this prepares these readout tubes to read out the condition of the first four stages I to IV of the binary counter. The plates of tubes 93 to 96 are connected over conductors 1, 2, 4 and 5 to segments 1, 2, 4 and 5 of the sending ring B of the transmitting distributor TD of FIG. 1; those tubes which are conducting provide paths to ground for their corresponding segments and thus send marking pulses. Segment 3 is connected, over conductor 3 in cable 38, through an isolating diode 115, FIG. 3, directly to the check lead 114 so that the segment is held marking when the check lead is grounded. The relatively high resistance paths through the tubes 93 to 96 make it impracticable to operate the output line relay LR of FIG. 1 directly, and therefore the amplifier tube 31 is employed to provide the necessary value of operating current for relay LR.

Contacts 2 of relay R2 lock up the relay to ground, and contacts 3 partly prepare a path for the operation of relay R3 which operates when brushes $b3$ pass over segment 4 of ring F. Contacts 2 of R3 lock the relay to ground, and contacts 3 partially prepare a path for the operation of R4. R4 is operated when brushes $b3$ pass over the rest segment R of ring F, and at its armature 1 transfers ground 113 from No. 1 check conductor 114 to No. 2 check conductor 116 which extends in cable 38 to the four readout tubes 97 to 100 of FIG. 3, and the latter tubes operate in the manner of tubes 93 to 96 to send out the second check character. Contacts 2 of R4 lock the relay to ground, and contacts 3 partially prepare a path for the operation of R5.

Relay R5 when energized from segment 5 of ring F, at its armature 1 connects a condenser C8 to positive battery to charge it up in preparation for the step of resetting the computer, and at its contacts 3 causes the relays R1 to R5 to release in order. The release of relay R1 causes the autostop circuit to be restored for normal transmission of message characters over the line L. The release of R2, R3 and R4 disable the read-out circuit for the check characters, and armature 1 of R5 when released connects the positively charged capacitor C8 to the reset conductor 105 thereby resetting all computer tubes 92 to their zero condition.

Receiving circuit

Figure 6:
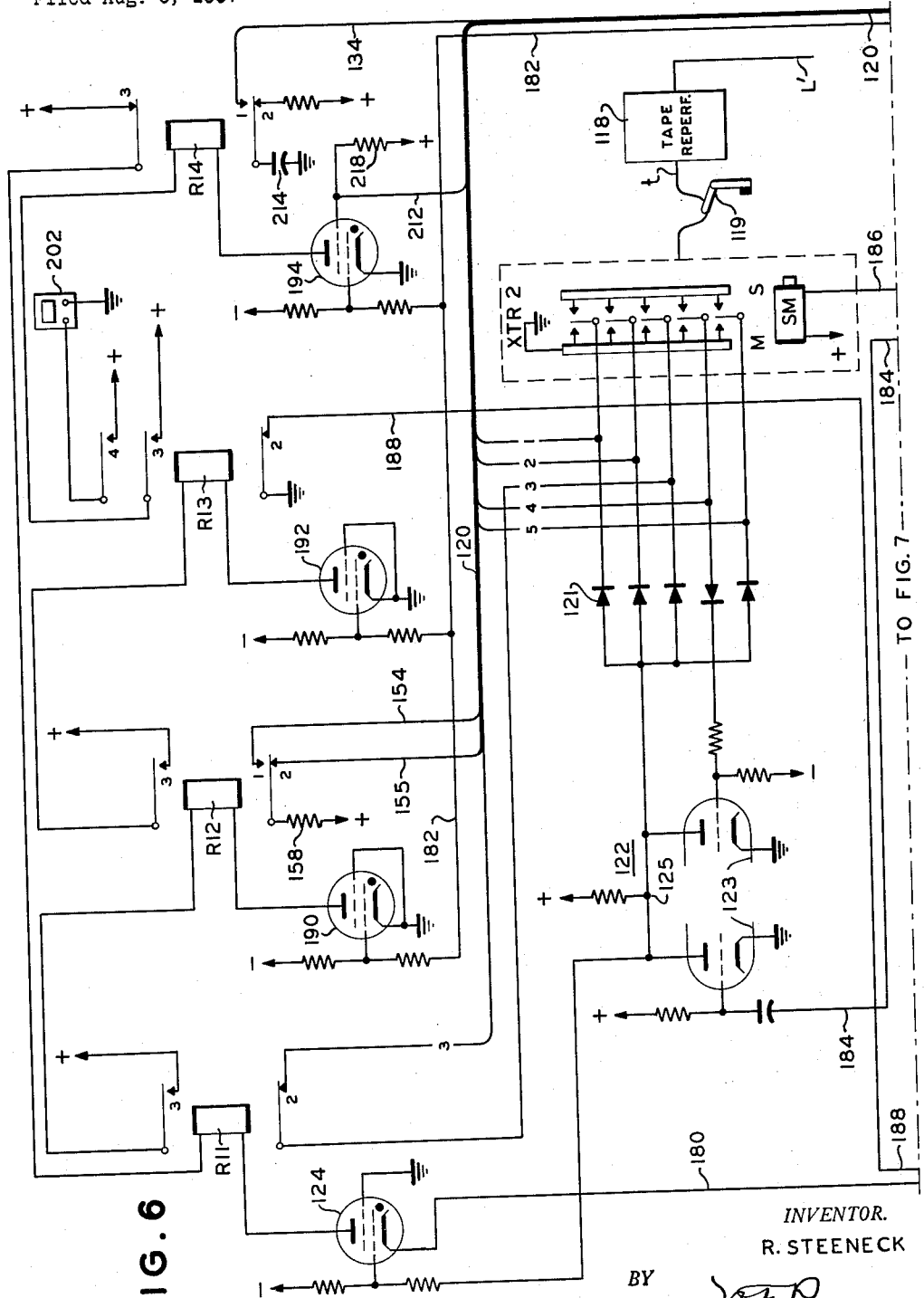

The receiving circuit is shown on FIGS. 6, 7, 8 and 9, and FIG. 10 is a timing chart of the various steps involved when the carriage return signal and the two following checking characters are received. Referring to FIG. 6, the signals from the transmitting station are received over an incoming line L' and operate a tape reperforator 118. The tape *t* which issues from the reperforator is inserted in a tape transmitter XTR 2 which senses the perforated characters for an error checking operation prior to the retransmission of the received message characters either to data processing equipment or over an outgoing circuit. A tape auto-stop arm 119 which engages a loop in the perforated tape *t* is employed to stop the tape transmitter in the event of a tight tape condition in known manner.

The conductors 1 to 5 leading from the contact tongues of the tape transmitter correspond to the five signal code levels, as in the transmitting part of the system. Conductors 1, 2, 4 and 5 directly enter a cable 120 and extend to the coupling tubes of FIG. 8, and conductor 3 leads to the lower armature and contact 2 of a relay R11 and thence into the cable 120. The conductors 1 to 5 from the tongues of the tape transmitter also extend, through suitably poled rectifiers 121, to a gating circuit 122 which is operative to detect the carriage return signal which when sensed by the tape transmitter indicates that the next two characters to be sensed are error checking characters and that an error checking operation is to be effected.

An astable multivibrator 128 seen in the lefthand portion of FIG. 7 is employed to generate timing pulses instead of a one-shot multivibrator as in the transmitting circuit. A manually operable switch 130, seen immediately below the multivibrator, when thrown downwardly to a Stop position opens the cathode of the lefthand section of the multivibrator when the system is at rest, and the lefthand switch blade and contact 131 are operative to connect a highly positively charged capacitor 132 to a reset conductor 134 that is operative to put all of the stages I to VIII of the binary computer of FIG. 9 in zero condition.

The tape *t*, FIG. 6, perforated by the incoming signals is inserted in the tape transmitter XTR 2, and the switch 130 of FIG. 7 is manually thrown upwardly to its Start position and applies ground potential to the cathode of the lefthand section of the multivibrator 128. This starts the tube sections of the multivibrator in operation, and pulses are successively applied to the tubes or tube sections 43' to 46' of the delay circuit, which tubes operate in the manner of the pulse-delay tubes 43 to 46 in the transmitting circuit hereinbefore described, that is, the capacitors C2' to C5' cause time-spaced pulses like the pulses P1 to P5 depicted in the timing chart of FIG. 10 to be formed on the plates of four tube sections 48' to 51'. These pulses are further amplified and sharpened by coupling them to tubes 60' to 63'. The two rectangles diagrammatically represent intermediate groups of tubes or tube sections 44', 45', 49', 50', 61' and 62', connected in the manner shown in regard to tubes 43', 48' and 60'.

The first timing pulse P1 is formed directly by the righthand section of the multivibrator 128 by coupling it directly to a tube 47', and is sufficiently sharp to require no further amplification. The signal pulses from the five tubes 47' and 60' to 63' are applied, by conductors 136 to 140, to the grids of the coupling tubes 142 to 150 of FIG. 8. The two rectangles shown represent coupling tubes 147 to 150 and their associated elements such as shown in detail at the left of the rectangles. A conductor 136 is connected to the grids of coupling tubes 142 and 148; conductor 137 is connected to the grids of coupling tubes 143 and 149; conductor 138 is connected to the grids of tubes 144 and 150; conductor 139 is connected to the grid of tube 145; and conductor 140 is connected to the grids of tubes 146 and 147.

The grid of each coupling tube is pulsed by the pulses generated sequentially by the tubes 47' and 60' to 63' of FIG. 7; however, only those pulses get through where the cathodes of the coupling tubes of FIG. 8 are grounded. Also, only those pulses get through where the coupling tube cathodes are not held at a high potential by the isolating circuit comprising diodes 152 connected either to conductor 154 or conductor 155 which enter the cable 120. The conductors 154 and 155 extend to contacts 1 and 2 respectively of a relay R12 seen in FIG. 6. Normally this relay is deenergized and conductor 155 is held at positive potential through a 100 ohm resistor 158 connected to the lower armature of the relay, and this makes the coupling tubes 147 to 150 of FIG. 8 ineffective even though they may be connected indirectly through their resistance networks and conductors 1, 2, 4 and 5 in cable 120 to ground at the marking bus M at the tape transmitter XTR 2. The two groups of conductors 1, 2, 4 and 5 respectively are connected in multiple with each other, either in the cable 120 or at the tape transmitter.

The plates of the coupling tubes are connected by means of conductors 160 to 167, through capacitor networks 90', FIG. 9, to the eight flip-flop stages I to VIII of the binary computer seen in the figure, each of which stages comprises a twin-section computer tube 92'. As in the case of the computer at the transmitting station, the conduction of any of the coupling tubes of FIG. 8 causes the bistable computer tubes to select their opposite stages of conduction, the computer tubes being connected so as to control each other serially to produce a binary count. It will be noted from the manner in which conductors 1, 2, 3, 4 and 5 are connected to the computer tubes that the signal code level positions have been transposed with respect to the stages of the computer in the same manner as at the transmitting station. Under normal conditions only the first five coupling tubes 142 to 146 are effective in response to the marking code pulses as the message characters are sensed by the tape transmitter and applied over conductors 1 to 5 in cable 120 to the coupling tubes.

When the carriage return signal is sensed by the transmitter XTR 2, the gating circuit 122 becomes operative to fire a thyratron tube 124, generally in the manner of the gating circuit at the transmitting station. The righthand section of tube 123 of the reading circuit is conducting except when the No. 4 code pulse from the tape transmitter is marking, and a resistor in the plate circuit is grounded out when either the first, second, third or fifth code pulse of a character is marking. The potential at the junction point 125 can only rise if both sections of tube 123 are not conducting and if code pulses 1, 2, 3 and 5 are all spacing. This condition prevails only when a carriage return signal is sensed by the reading pins of XTR 2 and a negative pulse is received over conductor 184 from the plate of tube 46' which is the last of the pulse-delay tubes to generate a negative pulse. Referring to FIG. 10 it will be seen that this reading function takes place just before the tape is stepped. At this time the thyratron 124 becomes conducting and pulls up relay R11 of the counting chain R11 to R14. The first checking character must then be applied to the computer in a normal manner except that, as hereinbefore stated, the No. 3 code pulse of each checking character is always made marking at the transmitting station to prevent the possibility of interference in switching operations, and therefore conductor 3 from the tape transmitter is opened at the lower armature and contact 2 of energized relay R11. The No. 3 signal code level is transposed to binary stage 5 of the computer, and hence the opening of conductor 3 results in dropping out the No. 5 binary stage of the computer at this time. Since there is positive battery at this time on conductor 155 of cable 120, coupling tubes 147 to 150 are not effective and the four binary digits represented by the first checking character are combined with the binary digits currently registered in the first four computer stages I to IV. At its upper armature and contact 3, relay R11 partially prepares a path for the operation of relay R12 which is under control of a thyratron 190. The latter tube is controlled by a positive pulse at the proper time, over conductor 182, which pulse is obtained by inverting the negative pulse previously applied to conductor 184 as previously described, by passing it through a tube 200, FIG. 7. This positive pulse also fires a thyratron 198 which energizes, over conductor 186, the stepping magnet SM to effect stepping of the tape. The stepping tube 198 is extinguished when the righthand side of multivibrator 128 becomes conducting and fires a thyratron 196 through a resistor network coupled to the plate of the lefthand section of 128.

After the first checking character has been sensed and applied to the computer, the tape is stepped one step in the tape transmitter as above described. The second checking character is then sensed, and relay R12 operates; at its upper armature and contact 3 it partially prepares a path for the operation of relay R13 which is under control of a thyratron 192. At its lower armature and contact 1 relay R12 transfers the positive battery to conductor 154 which makes the first four coupling tubes 142 to 145 ineffective, and places the computer under control of coupling tubes 147 to 150. At its upper armature and contact 3 relay R12 partially prepares a path for the operation of relay R13 which is controlled by a thyratron 192. When the four binary digits represented by the second checking character have been entered in the computer, the relay R13 will pull up and at its contact 2 opens, over conductor 188, the cathode of a thyratron 196, FIG. 7. This prevents the tape-stepping thyratron 198 from being extinguished and, over conductor 186, to keep the step magnet SM on the tape transmitter energized and hold the feeler pins down and hence the tongues away from the marking bus M. An additional computational step is thus attempted to be performed, but nothing is available in the pins of the transmitter.

At its upper armature and contact 4 relay R13 completes a circuit for the energization of a signal device 202 of any desired type, either visual or audible, for example, a buzzer, which indicates that a checking operation has been performed. At its armature and contact 3 the relay partially prepares a path for the operation of relay R14 which is controlled by a thyratron 194. It will be noted that thyratrons 124, 190 and 192 all receive operating pulses on their grids at the same instant, but only one relay of the group R12 to R14 can operate at one time since each relay depends upon the operation of the previous relay to complete its operating circuit. The time consumed by the operation of the previous relay is considerably longer than the pulse which tends to fire the thyratron.

The binary digits contained in the two checking characters represent the complement of the binary sum registered in the computer at the transmitting station, and when this complement is combined with the sum registered in the computer of FIG. 9, in response to the message characters including the carriage return characters, if no error had occurred in transmission all stages of the computer will register the digit 1, i.e., the lefthand section of each tube 92' will be conducting. The plates of all righthand sections of the computer tubes are connected through high resistances 210 and isolating diodes 211 to a common point represented by a conductor 212. Thus if all the computer stages are in the "1" condition, the conductor 212 will be at positive potential applied through a high resistor 218, FIG. 6, adjacent to the tube 194, and this indicates that no error occurred in transmission of the characters. The conductor is connected to the auxiliary grid of the thyratron 194, and positive potential on conductor 212 allows the thyratron to fire upon receipt of the firing pulse applied by conductor 182 to its grid, and operates relay R14 through contacts 3 of R13. The operation of R14 at its lower armature and contact 1 connects a positively charged capacitor 214 to the reset conductor 134 which extends in cable 120 to the computer of FIG. 9, and the positive charge on this conductor resets all the computer stages to their zero condition.

At its upper armature and contact 3 relay R14 opens the energizing circuit of relay R11 which releases, and at its contacts 3 releases R12; release of R12 at its contacts 3 releases R13 which at its contacts 3 releases R14 and at its contacts 4 opens the circuit of the signal device 202. Thus a momentary operation only of the signal device indicates that the checking operation has been performed and that no error had occurred; the stepping magnet SM is deenergized and a new block of data characters are started through the tape transmitter.

If an error is detected, i.e., if a single computer stage is in the zero condition, this stage will apply negative potential from the source 216 to the conductor 212, FIG. 9, and the negative potential present on the conductor will cause the auxiliary grid of the thyratron 194 of FIG. 6 to be highly negative; relay R14 therefore does not operate and the system will stop at this time. Relay R13 will remain energized and a continuous error signal will be produced by the signal device 202, whereupon the receiving station will notify the transmitting station to such effect and usually have the block of characters retransmitted in order to obviate the error. The foregoing checking operations are diagrammatically indicated in the timing chart of FIG. 10 in which the abbreviation CR refers to a carriage return signal; CK #1 and CK #2 respectively refer to the first and second checking characters; R11 to R14 refer to the relays above mentioned; and "CK O.K." means that the checking operation indicated that no error occurred in transmission.

Referring to the modification shown in FIG. 13, the error checking operations may be effected by directly comparing, at either the transmitting or receiving station, the totals registered in the computers at the stations or by comparing the complements of these totals. Preferably, and as shown in FIG. 13, the comparison is made at the receiving station between the totals registered in the computers. For simplicity, only those portions of the receiving circuit which have to be modified are shown in the drawing.

Since in this instance a direct comparison will be made at the receiving station between the totals registered in the computers, the checking characters sent by the transmitting station will represent the total registered in the binary computer instead of the complement of the total. For this purpose the conductors 91 of FIG. 3 will be connected to the plates of the righthand sections of the tubes 92 instead of the lefthand sections to cause the tubes 93–100 to read out the total instead of its complement; otherwise the operations at the transmitting station will be essentially the same as those hereinbefore described.

The eight stages I to VIII of the binary computer, FIG. 13, correspond to those of FIG. 9. However, the computer does not require the last four coupling tubes 147 to 150 of FIG. 8 since the comparison will be made between totals and hence only the first five coupling tubes 142 to 146 are used. The chain of relays R11' to R14' correspond to the relays R11 to R14 of FIG. 6 with the following exceptions: Relays R11' and R12' are slow to operate, as indicated, in order that they will pull up after the tape transmitter pins are pulled down and thereby prevent the storage of the wrong characters in the relays R18, shown in the lower portion of FIG. 13, hereinafter described. Specifically, the carriage return signal must be cleared out before setting up circuits to store the first checking character sensed, and similarly, to insure that the first checking character is cleared out before setting up circuits to store the second checking character. Also, relays R11' to R14' embody the various contacts 1 to 4 shown in FIG. 6 (not shown in FIG. 13) and include additional contacts seen in FIG. 13, except that contacts 1' and 2' of relay 12' correspond to the contacts 1 and 2 of relay R12, and contacts 2' of relay R13' correspond to the contacts 1 and 2 of relay 13, but the circuit control thereby is slightly different in FIG. 13.

When the carriage return signal has been sensed by the tape transmitter XTR 2, relay R11' operates in the manner hereinbefore stated and opens the No. 3 conductor from the tape transmitter and disables the input to the No. 5 binary stage, and additionally its contacts 4 disable the coupling tubes 142 to 145, shown schematically in the upper lefthand portion of FIG. 13, by applying positive potential to their cathodes whereby no further computation of the binary numbers will occur so long as the relay remains operated.

Energized relay R11' at its contacts 5 partially prepares a path over conductor 220 to the righthand operate windings of the first four relays R18 (reading from left to right), the return circuits for the operate windings comprising the conductors 1, 2, 4 and 5 leading to the tape transmitter tongues, so that the marking pulses sensed will selectively energize the proper relays R18 which thus read the first checking character; the relays remain deenergized where spacing pulses are sensed. Each of the relays which is energized locks up through its lefthand locking winding to conductor 228. The first four relays R18 thus store the binary bits of the first checking character. Isolating diodes 222 are employed to prevent multiple interference paths.

Above each relay R18 is a relay R16; relays R16 are controlled by electron tubes 224 for reading the condition of the twin-section tubes 92' comprising the computer stages. The righthand section of each computer tube is conducting and the lefthand section is nonconductive when zero is registered in that binary stage, and this causes the potential at the plate of the righthand section to reduce to a negative value so that the associated tube 224 will be nonconductive, and the relay R16 does not operate. On the other hand, if a computer stage has "1" registered therein, the lefthand section of the tube 92' is conducting and the righthand section is nonconductive, and the resulting rise in potential at the plate of the righthand section will cause the tube 224 to conduct and operate the associated relay R16. The first group of four relays R16 are selectively energized in accordance with the states of the first four stages I to IV of the computer.

When the second checking character is received, relay R12' pulls up in the manner of R12 hereinbefore described. At its armature and contact 1', relay R12' applies positive battery to a conductor 230 to condition for operation the last group of four reading relays R18; those of the reading relays which are operated by the second checking character lock up to the conductor 228, so that these relays store the second checking character. The last group of four relays R16 are selectively energized in accordance with the states of the last four stages V to VIII of the computer.

The armatures of each of the eight pairs of relays R16 and R18 control contacts 1 and 2 so as to comprise a chain circuit through these contacts and a conductor 226. If the positions of both relays of each pair correspond the chain circuit is closed; if the positions of the relays of any pair do not correspond the chain circuit is open.

Relay R13' operates and performs the same function as R13 of FIG. 6, except that at its contacts 2' the relay applies battery from the chain circuit 226 in the event that all eight pairs of relays R16 to R18 are in agreement, which will energize relay R14'; if there is a mismatch, the chain circuit is open and R14' does not operate, and an error in transmission of the message characters is indicated. Relay R14' performs the same functions as R14 of FIG. 6, including the function of resetting the computer over conductor 134. When energized relay R14' at its additional contacts 4 opens conductor 228 to release the locked-up relays R18, and the system is in condition to receive the next line of data.

While the invention has been described with reference to particular embodiments thereof and in connection with particular uses, it is not to be regarded as limited thereto since various modifications, substitutions, and uses thereof will occur to those skilled in the art without departing from the spirit and scope of the invention as set forth in the appended claims.

What is claimed is:

1. A system for detecting errors occurring in pulse code telegraph transmission from a sending station to a receiving station and in which the code pulses of marking and spacing nature which comprise each message character respectively occupy different signal code levels, comprising means at the sending station for generating the code pulses comprising each character of a message, means for transmitting said message characters to the receiving station, an electronic computer at each of said stations having stages of different denominational orders respectively individual to said signal code levels and connected to assign different computational values respectively to the different signal code levels of each of the message characters, said assigned values being such that the sum of the values representing any two adjacent signal code levels of a character will not be equal to the value representing any one of the remaining code levels of the character, said computer having a storage capacity differing from the computational value assigned to any one of said signal code levels, means for sensing the generated code pulses of one nature and applying them selectively to the stages of the computer at the sending station until a selected group of said message characters have been sensed, means at the receiving station for sensing the received message characters of said group and generating the code pulses of marking and spacing nature which comprise each received message character, means for selectively applying the received code pulses of said one nature to the stages of the computer at the receiving station, means at one of said stations operative after the last of the message characters of said group has been sensed for producing checking signals representative of the resultant numerical sum obtained by the computer at that station, means for transmitting said checking signals to the other station, and error detecting means at said other station controlled jointly by the received checking signals and the resultant numerical sum obtained by the computer at said other station for producing an error signal in the event that an error occurred in the transmission of said group of message characters.

2. A system according to claim 1, in which the sending station has said means for producing and transmitting the checking signals, and the receiving station has said error detecting means jointly controlled by said checking signals and the resultant numerical sum obtained by the computer for producing an error signal at that station in the event that an error occurred in the transmission of said group of message characters.

3. A system according to claim 2, in which means are provided at the sending station for transmitting to the receiving station a predetermined preparatory signal after the last of the message characters of the selected group has been transmitted and prior to the transmission of the checking signals, and means at the receiving station responsive to said preparatory signal for causing the immediately following checking signals to be applied to the error detecting means.

4. A system according to claim 3, in which means are provided at the sending station for causing said preparatory signal invariably to comprise a carriage return signal, and said means at the receiving station is responsive to said carriage return signal for causing the immediately following checking signals to be applied to the error detecting means.

5. A system for detecting errors occurring in pulse code telegraph transmission from a sending station to a receiving station and in which the marking and spacing code pulses which comprise each message character respectively occupy different signal code levels, comprising means at the sending station for generating the code pulses comprising each character of a message, means for transmitting said message characters to the receiving station, an electronic computer at each of said stations having stages of different denominational orders respectively individual to said signal code levels and connected to assign different computational values respectively to the different signal code levels of each of the message characters, said assigned values being such that the sum of the values representing any two adjacent signal code levels of a character will not be equal to the value representing any one of the remaining code levels of the character, said computer having a total storage capacity greater than the largest computational value assigned to any of said levels, means for sensing the generated marking code pulses and applying them selectively to the stages of the computer at the sending station until a selected group of said message characters have been sensed, means at the receiving station for sensing the received message characters of said group and generating the code pulses of marking and spacing nature which comprise each received message character, means for selectively applying the received marking code pulses to the stages of the computer at the receiving station, means at one of said stations operative after the last of the message characters of said group has been sensed for producing checking signals representative of the resultant numerical sum obtained by the computer at that station, means for transmitting said checking signals to the other station, and error detecting means at said other station controlled jointly by the received checking signals and the resultant numerical sum obtained by the computer at said other station for producing an error signal in the event that an error occurred in the transmission of said group of message characters.

6. A system for detecting errors occurring in pulse code telegraph transmission from a sending station to a receiving station and in which the code pulses of marking and spacing nature which comprise each message character respectively occupy different signal code levels, comprising means at the sending station for generating the code pulses comprising each character of a message, means for transmitting said message characters to the receiving station, an electronic binary computer at each of said stations having parallel input stages of different binary denominational orders respectively individual to said signal code levels and connected to assign different computational values respectively to the different signal code levels of each of the message characters, said assigned values being determined by a progression in the binary system of numbers in which the sum of the values representing any two adjacent signal code levels of a character will not equal the value representing any one of the remaining code levels of the character, means for sensing the generated code pulses of one nature and applying them selectively to the stages of the computer at the sending station until a selected group of said message characters have been sensed, means at the receiving station for sensing the received message characters of said group and generating the code pulses of marking and spacing nature which comprise each received message character, means for selectively applying the received code pulses of said one nature to the stages of the binary computer at the receiving station, means at one of said stations operative after the last of the message characters of said group has been sensed for producing binary digit checking signals representative of the resultant binary number obtained by the computer at that station, means for transmitting said checking signals to the other station, and means at said other station controlled jointly by the received checking signals and the resultant binary number obtained by the computer at said other station for producing an error signal in the event that an error occurred in the transmission of said group of message characters.

7. A system according to claim 6, in which the means at one of said stations for producing and transmitting said checking signals causes them to represent the binary complement of said resultant binary number means at said other station for combining said binary complement with the resultant binary number obtained by the computer at said other station, and means controlled by the status of the resulting binary denominational orders of the computer at said other station for indicating whether an error occurred in the transmission of said group of message characters.

8. A system according to claim 6 in which the parallel input stages of the computer at each station comprise computer tubes which are coupled so as to control each other serially to produce a binary count, and means including timing circuits for causing said pulses of one nature to be selectively applied in succession to the parallel input stages to prevent interference with the serial coupling between the stages.

9. A system for detecting errors occurring in pulse code telegraph transmission from a sending station to a receiving station and in which the code marking and spacing pulses which comprise each message character respectively occupy different signal code levels, comprising means at the sending station for generating the code pulses comprising each character of a message, means for transmitting said message characters to the receiving station, an electronic binary computer at each of said stations having parallel input stages of different binary denominational orders respectively individual to said signal code levels and connected to assign different computational values respectively to the different signal code levels of each of the message characters, said assigned values being determined by a progression in the binary system of numbers in which the sum of the values representing any two adjacent signal code levels of a character will not equal the value representing any one of the remaining code levels of the character, means for sensing the generated marking code pulses and applying them selectively to the stages of the computer at the sending station until a selected group of said message characters have been sensed, means at the receiving station for sensing the received message characters of said group and generating the code pulses of marking and spacing nature which comprises each received message character, means for selectively applying the received marking code pulses to the input stages of the computer at the receiving station, means at one of said stations operative after the last of the message characters of said group has been sensed for producing binary digit checking signals representative of the resultant binary number obtained by the computer at that station, means for transmitting said checking signals to the other station, and means at said other station controlled jointly by the received checking signals and the resultant binary number obtained by the computer at said other station for producing an error signal in the event that an error occurred in the transmission of said group of message characters.

10. A system for detecting errors occurring in pulse code telegraph transmission from a sending station to a receiving station and in which the code pulses of marking and spacing nature which comprise each message character respectively occupy different signal code levels, comprising means at the sending station for generating the code pulses comprising each character of a message, said message characters including certain function signals interspersed with the intelligence characters, means for transmitting said message characters to the receiving station, a computer at each of said stations having stages of different denominational orders respectively individual to said signal code levels and connected to assign different computational values respectively to the different signal code levels of each of the message characters, said assigned values being such that the sum of the values representing any two adjacent signal code levels of a character will not be equal to the value representing any one of the remaining code levels of the character, means for sensing the generated code pulses of one nature and applying them selectively to the stages of the computer at the sending station until a selected group of said message characters have been sensed, means at the receiving station for sensing the received message characters of said group and generating the code pulses of marking and spacing nature which comprise each received message character, means for selectively applying the received code pulses of said one nature to the stages of the computer at the receiving station, means at one of said stations operative after the last of the message characters of said group has been sensed for producing checking signals representative of the resultant numerical sum obtained by the computer at that station, means for modifying said checking signals to prevent them from fortuitously corresponding to any of said function signals, means for transmitting said modified checking signals to the other station, and error detecting means at said other station controlled jointly by the received checking signals and the resultant numerical sum obtained by the computer at said other station for producing an error signal in the event that an error occurred in the transmission of said group of message characters.

11. A system according to claim 10, comprising means operative to invariably insert at least one code pulse of predetermined nature in a predetermined signal code level in said checking signals to prevent them from fortuitously corresponding to any of said function signals.

12. A system according to claim 10 in which said checking signals are composed of a plurality of code pulses representing said resultant obtained by the computer at said one of the stations, and means for invariably adding to said checking signals at least one predetermined code pulse to prevent the checking signals from fortuitously corresponding to any of said function signals.

13. A system according to claim 12, including means at the other station automatically operative to disregard said added predetermined code pulse in the received checking signals prior to applying the checking signals to said error detecting means.

14. A system for detecting errors occurring in pulse code telegraph transmission from a sending station to a receiving station and in which the code pulses of marking and spacing nature which comprise each message character respectively occupy different signal code levels, comprising means at the sending station for generating the code pulses comprising each character of a message, means for transmitting said message characters to the receiving station, means at each of the stations for sensing the code pulses forming the different message characters transmitted for producing different error check numbers respectively having different computational values and in which the sum of the values representing any two adjacent signal code levels of a message character will not be equal to the value representing any one of the remaining code levels of the character, means comprising a computer at each of said stations having a capacity in excess of the aggregate computational values assigned to each of said levels, means for applying said computational values of each pulse of one nature of said message characters to said computer for adding the said error check numbers until a selected group of said message characters have been transmitted, means at one of said stations operative after the last of the message characters of said selected group has been sensed for producing checking signals representing a plurality of digits which are representative of the numerical sum obtained by the computer at that station, means for transmitting said checking signals to the other station, and error detecting means at said other station controlled jointly by the received checking signals and the resultant numerical sum obtained by the computer at said other station for producing an error signal in the event that an error occurred in the transmission of said group of message characters.

15. A system for detecting errors occurring in pulse code telegraph transmission from a sending station to a receiving station and in which the code pulses of marking and spacing nature which comprise each message character respectively occupy different signal code levels, comprising means at the sending station for generating the code pulses comprising each character of a message, means for transmitting said message characters to the receiving station, means at each of the stations for sensing the code pulses forming each of the different message characters transmitted for producing different error check numbers respectively individual to the different possible code combinations comprising the message characters whereby each of the message characters is represented by an error check number having a predetermined numerical value that is different from that of any of the other message characters, means comprising a computer at each of said stations having a capacity in excess of the aggregate computational values assigned to each of said levels, means for applying said computational values of each pulse of one nature of said message characters to said computer for adding the said error check numbers until a selected group of said message characters have been transmitted, means at one of said stations operative after the last of the message characters of said selected group has been sensed for producing checking signals representing a plurality of digits which are representative of the numerical sum obtained by the computer at that station, means for transmitting said checking signals to the other station, and error detecting means at said other station controlled jointly by the received checking signals and the resultant numerical sum obtained by the computer at said other station for producing an error signal in the event that an error occurred in the transmission of said group of message characters.

References Cited in the file of this patent

UNITED STATES PATENTS

| | | |
|---|---|---|
| 1,972,326 | Angel | Sept. 4, 1934 |
| 2,242,196 | Thompson et al. | May 13, 1941 |
| 2,281,745 | Buckingham | May 5, 1942 |
| 2,596,199 | Bennett | May 13, 1952 |
| 2,653,996 | Wright | Sept. 29, 1953 |
| 2,689,950 | Bayliss et al. | Sept. 21, 1954 |
| 2,850,718 | Davison | Sept. 2, 1958 |